US012579576B2

(12) United States Patent
Marold et al.

(10) Patent No.: US 12,579,576 B2
(45) Date of Patent: Mar. 17, 2026

(54) METHOD AND SYSTEM FOR ARTIFICIAL INTELLIGENCE BASED ENHANCEMENT OF SALE PROCESSES

(71) Applicant: JPMorgan Chase Bank, N.A., New York, NY (US)

(72) Inventors: Jake Marold, Pound Ridge, NY (US); Mike Dai, East Rutherford, NJ (US); Harlan Vossos, Hondo, TX (US); Stuart Cruikshanks, London (GB); William Peak, New Canaan, CT (US); Guo-Zheng Yoong, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 79 days.

(21) Appl. No.: 18/535,297

(22) Filed: Dec. 11, 2023

(65) Prior Publication Data

US 2025/0191064 A1    Jun. 12, 2025

(51) Int. Cl.
*G06Q 40/04*          (2012.01)
*G06N 20/00*          (2019.01)

(52) U.S. Cl.
CPC ........... *G06Q 40/043* (2025.08); *G06N 20/00* (2019.01); *G06Q 40/04* (2013.01); *G06Q 40/0421* (2025.08); *G06Q 40/0431* (2025.08); *G06Q 40/045* (2025.08)

(58) Field of Classification Search
CPC .. G06Q 40/04; G06Q 40/0421; G06Q 40/431; G06Q 40/0431; G06Q 40/045; G06Q 40/06; G06N 20/00

USPC .......................................................... 705/37
See application file for complete search history.

(56) References Cited

U.S. PATENT DOCUMENTS

| | | | |
|---|---|---|---|
| 2009/0177568 A1 | 7/2009 | Hodges et al. | |
| 2019/0035386 A1 | 1/2019 | Leeb et al. | |
| 2019/0057450 A1 | 2/2019 | Mark et al. | |
| 2021/0049510 A1 | 2/2021 | Adjaoute | |
| 2022/0019624 A1 | 1/2022 | Gwozdz et al. | |
| 2022/0198562 A1* | 6/2022 | Cella ...................... | G06Q 40/04 |
| 2022/0366494 A1* | 11/2022 | Cella ........................ | H04L 9/50 |

OTHER PUBLICATIONS

International Search Report in corresponding International Application No. PCT/US2024/059340, dated Jan. 23, 2025.

* cited by examiner

*Primary Examiner* — Lindsay M Maguire
(74) *Attorney, Agent, or Firm* — GREENBLUM & BERNSTEIN, P.L.C.

(57) ABSTRACT

The method includes: receiving a communication that relates to a request for a price quote for at least one equity derivative product; extracting from the communication, attributes of the requested price quote for the at least one equity derivative product; generating based on the extracted attributes, a template request that has a predetermined format for each of the at least one equity derivative product; displaying, via a graphical user interface (GUI), each template request for review by a user, wherein the GUI includes an input mechanism for at least one of accepting and modifying each template request; transmitting each reviewed template request to a pricing system; receiving, from the pricing system, a quote for each of the at least one equity derivative product; and displaying, by the GUI, the price quote.

20 Claims, 8 Drawing Sheets

400

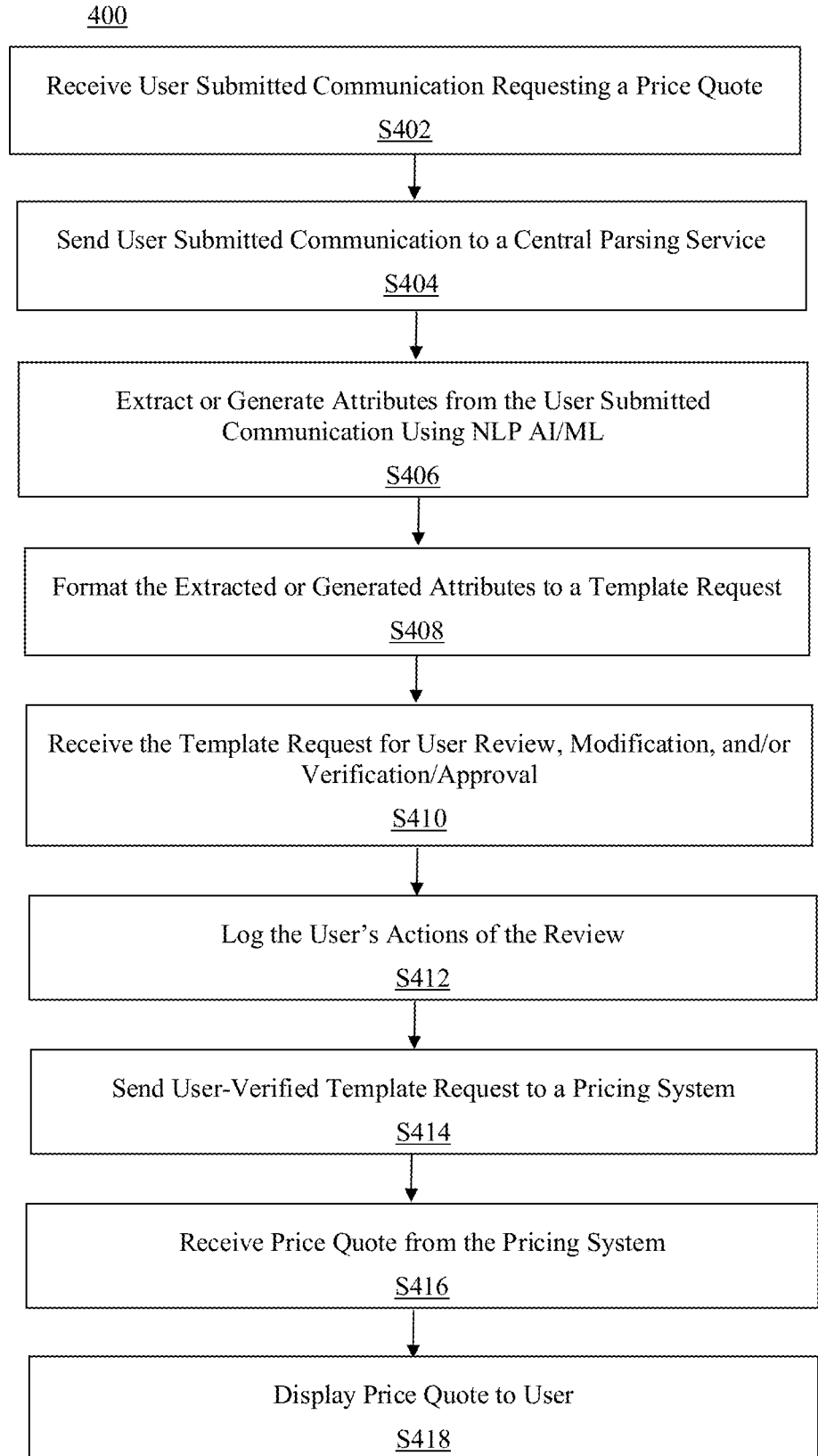

Receive User Submitted Communication Requesting a Price Quote
S402

Send User Submitted Communication to a Central Parsing Service
S404

Extract or Generate Attributes from the User Submitted
Communication Using NLP AI/ML
S406

Format the Extracted or Generated Attributes to a Template Request
S408

Receive the Template Request for User Review, Modification, and/or
Verification/Approval
S410

Log the User's Actions of the Review
S412

Send User-Verified Template Request to a Pricing System
S414

Receive Price Quote from the Pricing System
S416

Display Price Quote to User
S418

METHOD AND SYSTEM FOR ARTIFICIAL INTELLIGENCE BASED ENHANCEMENT OF SALE PROCESSES

BACKGROUND

1. Field of the Disclosure

This technology generally relates to methods and systems for using artificial intelligence (AI) to determine pricing of equity derivative products, and more particularly to methods and systems for using AI techniques to stage and complete pricing requests of equity derivative products by automatically formatting natural language requests for price quotes of equity derivative products to standardized template formats and retrieving the requested price quotes from pricing systems.

2. Background Information

Equity derivatives businesses operate via a rapid sales-client workflow. Clients are typically institutional investors but can be any client interested in buying and/or selling of equity derivatives. Equity derivatives include a diverse range of product offerings such as puts, calls, other various options, or more complex strategies based on purchasing a combination of the above. They can be single-leg requests or multi-leg requests and pricing specific information may be impacted based on package requests (e.g., multiple trade legs considered from a risk-perspective as a whole).

Sales divisions are responsible for managing client relationships including the pitching and execution of trade ideas. This management occurs typically through one or more unstructured natural language communication pathways (chat, voice, email, etc.). Unstructured communication channels include interactions between parties on both general topics of interest, as well as specific financial products.

One of the main responsibilities of a salesperson is to manage the clients' real-time requests for quote (RFQ) and execution. A RFQ is a process in which a company solicits select suppliers and contractors to submit price quotes and bids for the chance to fulfill certain tasks or projects. This process involves raising client requests for trading or automatic pricing systems to quote prices, whereby those prices may be subsequently confirmed as trades, as well as identifying missed trade opportunities based on natural language discourse. Manual entry of the financial product attributes from raw natural language is a core part of the sales function. It is a repetitive and error-prone task which requires translating information in unstructured text or voice into a relevant Order Management System (OMS). As such, this is a process which can be greatly expedited using technology, natural language processing (NLP) techniques, and machine learning (ML) tools.

There is a need for a system available in the marketplace that can perform the entire sequencing of steps involved in successfully pricing an initial request from natural language, and communicating subsequent pricing details to the requesting party.

SUMMARY

The present disclosure, through one or more of its various aspects, embodiments, and/or specific features or sub-components, provides, inter alia, various systems, servers, devices, methods, media, programs, and platforms for using AI techniques to stage and complete pricing requests of equity derivative products by automatically formatting natural language requests for price quotes of equity derivative products to standardized template formats and retrieving the requested price quotes from pricing systems. According to an aspect of the present disclosure, a method for pricing of equity derivative products is provided. The method is implemented by at least one processor. The method includes: receiving, by the at least one processor, a communication that relates to a request for a price quote for at least one equity derivative product; extracting, by the at least one processor from the communication, attributes of the requested price quote for the at least one equity derivative product; generating, by the at least one processor based on the extracted attributes, a template request that has a predetermined format for each of the at least one equity derivative product; displaying, by the at least one processor via a graphical user interface (GUI), each template request for review by a user, wherein the GUI includes an input mechanism for at least one from among accepting and modifying each template request; transmitting, by the at least one processor, each reviewed template request to a pricing system; receiving, by the at least one processor from the pricing system, a price quote for each of the at least one equity derivative product; and displaying, by the GUI, the price quote.

The extracting of the attributes may include applying at least one from among an AI tool and a ML tool to identify each of an asset, an expiration date, a strike price, a type of equity derivative product, and a number of units from the communication; and formatting each of the asset, the expiration date, the strike price, the type of equity derivative product, and the number of units into the template request having the predetermined format.

The at least one from among the AI tool and the ML tool may analyze the communication using an NLP technique to identify and extract the attributes from the communication and to format the attributes to the template request having the predetermined format.

The attributes may include at least one from among assets, dates, types of requested equity derivative products, strike prices, units, expiration dates, notionals, and currencies.

The communication may include at least one from among an un-structured text request, a colloquial terminology request, and a natural language request, and wherein the communication is received via at least one from among a voice command, an audio command, a text command, an email command, and an electronic communication command.

The at least one equity derivative product may include textual information relating to at least one from among an option, a put, a call, a future, a warrant, a swap, a single-leg option, a put spread, a call spread, call vs call, a barrier option, and a multi-leg option.

The modifying of each template request may include prompting the user to provide an input for at least one from among adding at least one attribute parameter, removing at least one attribute parameter, and altering at least one attribute parameter from each template request.

The extracting of the attributes may further include analyzing, by the at least one processor, the communication to identify at least one sequence of characters and a respective attribute category that is included in a list of attribute categories that is associated with the predetermined format; and the generating of the template request may include designating each of the extracted at least one sequence of characters in order by their respective attribute category to match the predetermined format.

The generating of the template request may further include applying a sequence of natural language understanding (NLU) routines for performing the designating of each of the extracted at least one sequence of characters, and when at least one attribute from the predetermined format is missing from the extracted attributes, the method may further include generating a default attribute value to populate the template request to match the predetermined format.

According to another aspect of the present disclosure, a computing apparatus for pricing of equity derivative products is provided. The computing apparatus includes a processor; a memory; a display; and a communication interface coupled to each of the processor, the memory, and the display. The processor is configured to: receive, via the communication interface, a communication that relates to a request for a price quote for at least one equity derivative product; extract attributes of the requested price quote for the at least one equity derivative product; generate, based on the extracted attributes, a template request that has a predetermined format for each of the at least one equity derivative product; display, by the display via a GUI, each template request for review by a user, wherein the GUI includes an input mechanism for at least one from among accepting and modifying each template request; transmit, via the communication interface, each reviewed template request to a pricing system; receive, via the communication interface from the pricing system, a price quote for each of the at least one equity derivative product; and display, by the display via the GUI, the price quote.

The processor may be further configured to extract the attributes by: applying at least one from among an AI tool and a ML tool to identify each of an asset, an expiration date, a strike price, a type of equity derivative product, and a number of units from the communication; and formatting each of the asset, the expiration date, the strike price, the type of equity derivative product, and the number of units into the template request having the predetermined format.

The at least one from among the AI tool and the ML tool may analyze the communication using an NLP technique to identify and extract the attributes from the communication and to format the attributes to the template request having the predetermined format.

The attributes may include at least one from among assets, dates, types of requested equity derivative products, strike prices, units, expiration dates, notionals, and currencies.

The communication may include at least one from among an un-structured text request, a colloquial terminology request, and a natural language request, and wherein the communication is received via at least one from among a voice command, an audio command, a text command, an email command, and an electronic communication command.

The at least one equity derivative product may include textual information relating to at least one from among an option, a put, a call, a future, a warrant, a swap, a single-leg option, a put spread, a call spread, call vs call, a barrier option, and a multi-leg option.

The modifying of each template request may include prompting the user to provide an input for at least one from among adding at least one attribute parameter, removing at least one attribute parameter, and altering at least one attribute parameter from each template request.

The processor may be further configured to extract the attributes by analyzing the communication to identify at least one sequence of characters and a respective attribute category that is included in a list of attribute categories that is associated with the predetermined format; and generate the template request by designating each of the extracted at least one sequence of characters in order by their respective attribute category to match the predetermined format.

The processor may be further configured to generate the template request by: applying a sequence of NLU routines for the designating of each of the extracted at least one sequence of characters, and when at least one attribute from the predetermined format is missing from the extracted attributes, generating a default attribute value to populate the template request to match the predetermined format.

According to yet another aspect of the present disclosure, a non-transitory computer readable storage medium storing instructions for pricing of equity derivative products is provided. The storage medium includes executable code which, when executed by a processor, causes the processor to: receive, via the communication interface, a communication that relates to a request for a price quote for at least one equity derivative product; extract attributes of the requested price quote for the at least one equity derivative product; generate, based on the extracted attributes, a template request that has a predetermined format for each of the at least one equity derivative product; display, by the display via a GUI, each template request for review by a user, wherein the GUI includes an input mechanism for at least one from among accepting and modifying each template request; transmit, via the communication interface, each reviewed template request to a pricing system; receive, via the communication interface from the pricing system, a price quote for each of the at least one equity derivative product; and display, by the display via the GUI, the price quote.

The executable code may further extract the attributes by: applying at least one from among an AI tool and a ML tool to identify each of an asset, an expiration date, a strike price, a type of equity derivative product, and a number of units from the communication; and formatting each of the asset, the expiration date, the strike price, the type of equity derivative product, and the number of units into the template request having the predetermined format.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for using AI techniques to stage and complete pricing requests of equity derivative products by automatically formatting natural language requests for price quotes of equity derivative products to standardized template formats and retrieving the requested price quotes from pricing systems.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
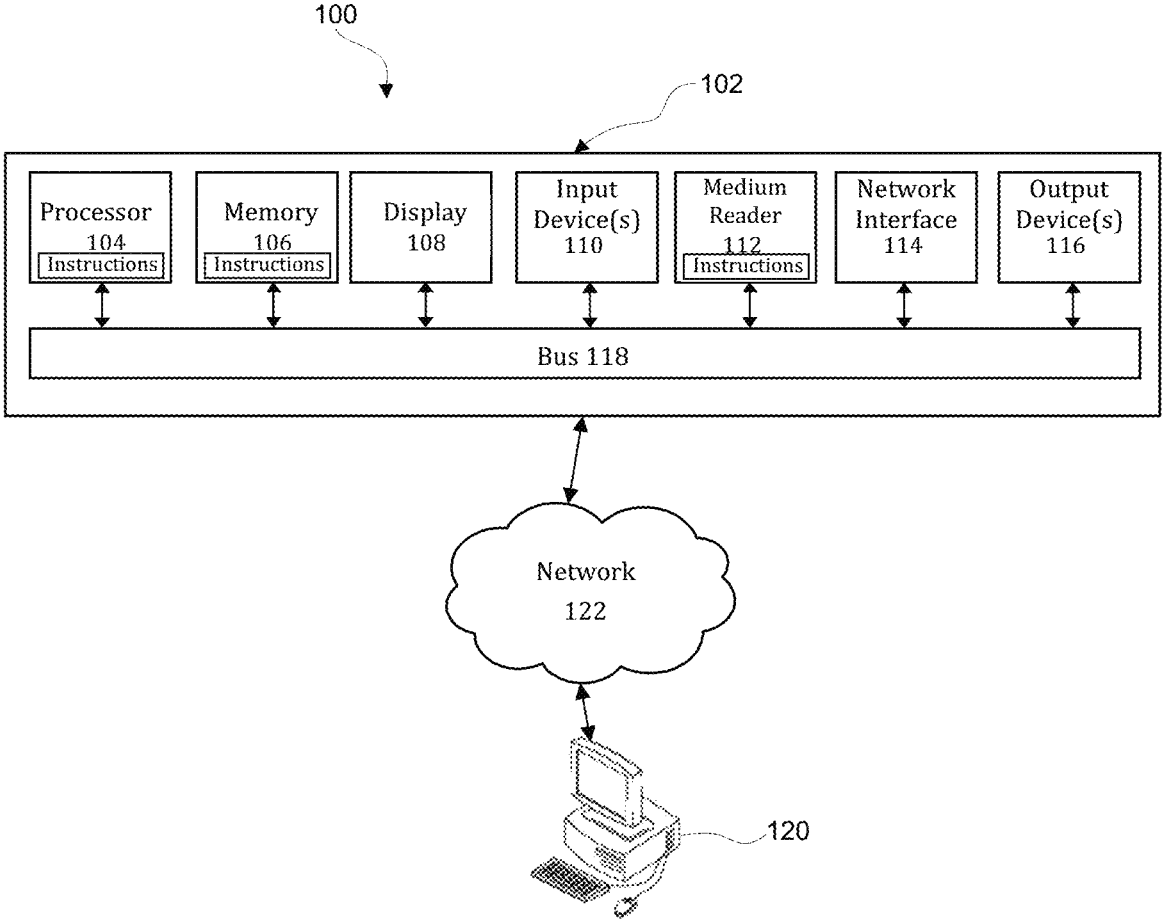
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Figure 2:
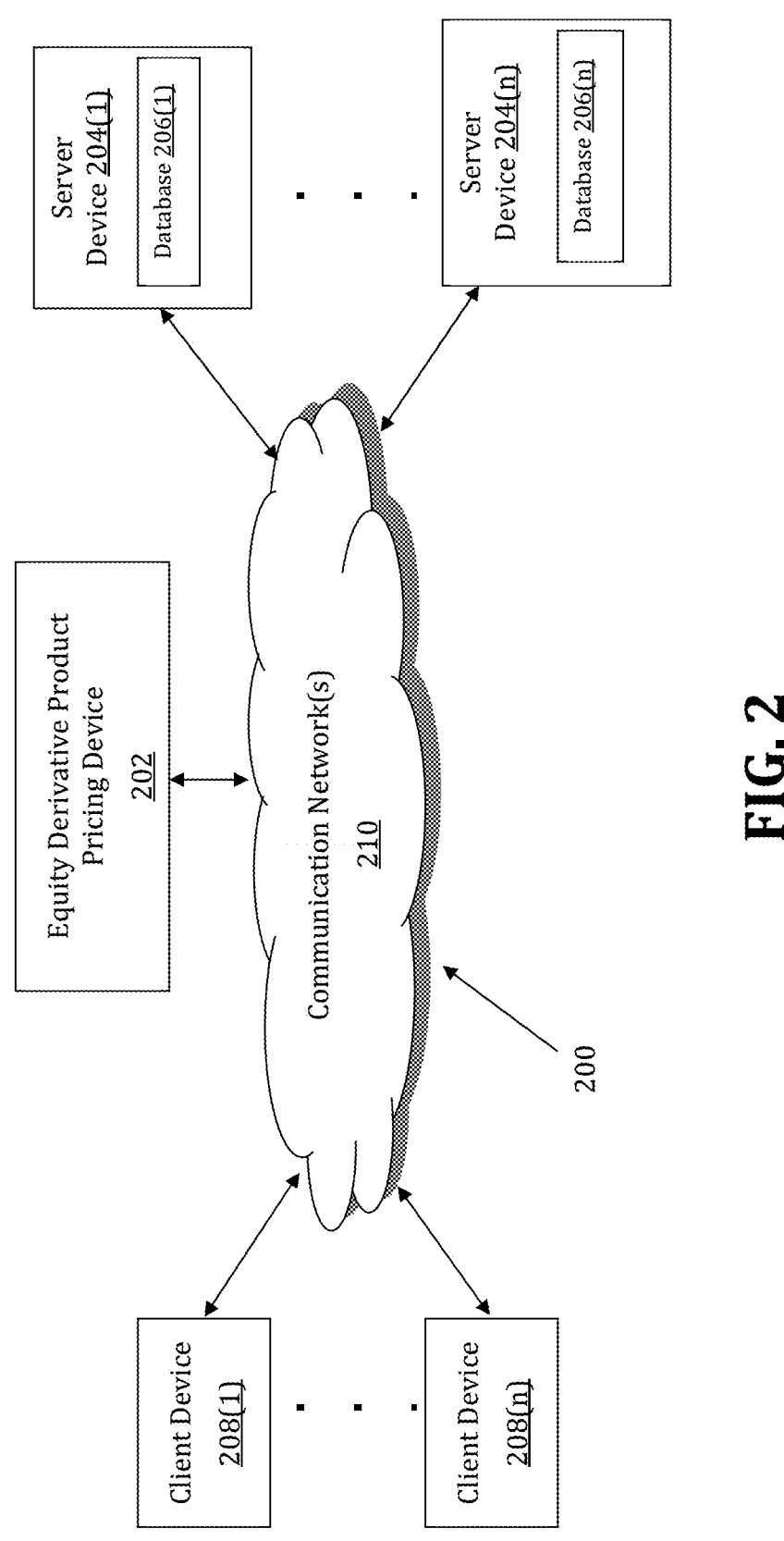
FIG. 2 illustrates an exemplary diagram of a network environment.

Referring to FIG. 2, a schematic of an exemplary network environment 200 for implementing a method for using AI techniques to stage and complete pricing requests of equity derivative products by automatically formatting natural language requests for price quotes of equity derivative products to standardized template format and retrieving the requested price quotes from pricing systems, is illustrated. In an exemplary embodiment, the method is executable on any networked computer platform, such as, for example, a personal computer (PC).

The method for using AI techniques to stage and complete pricing requests of equity derivative products by automatically formatting natural language requests for price quotes of equity derivative products to standardized template format and retrieving the requested price quotes from pricing systems may be implemented by an equity derivative product pricing device 202. The equity derivative product pricing device 202 may be the same or similar to the computer system 102 as described with respect to FIG. 1. The equity derivative product pricing device 202 may store one or more applications that can include executable instructions that, when executed by the equity derivative product pricing device 202, cause the equity derivative product pricing device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the equity derivative product pricing device 202 itself, may be located in virtual server(s) running in a cloud-based computing environment rather than being tied to one or more specific physical network computing devices. Also, the application(s) may be running in one or more virtual machines (VMs) executing on the equity derivative product pricing device 202. Additionally, in one or more embodiments of this technology, virtual machine(s) running on the equity derivative product pricing device 202 may be managed or supervised by a hypervisor.

In the network environment 200 of FIG. 2, the equity derivative product pricing device 202 is coupled to a plurality of server devices 204(1)-204(n) that hosts a plurality of databases 206(1)-206(n), and also to a plurality of client devices 208(1)-208(n) via communication network(s) 210. A communication interface of the equity derivative product pricing device 202, such as the network interface 114 of the computer system 102 of FIG. 1, operatively couples and communicates between the equity derivative product pricing device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the equity derivative product pricing device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and equity derivative product pricing devices that efficiently implement a method for using AI techniques to stage and complete pricing requests of equity derivative products by automatically formatting natural language requests for price quotes of equity derivative products to standardized template formats and retrieving the requested price quotes from pricing systems.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The equity derivative product pricing device 202 may be a standalone device or integrated with one or more other devices or apparatuses, such as one or more of the server devices 204(1)-204(n), for example. In one particular example, the equity derivative product pricing device 202 may include or be hosted by one of the server devices 204(1)-204(n), and other arrangements are also possible. Moreover, one or more of the devices of the equity derivative product pricing device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the equity derivative product pricing device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to the AI and ML model and data that relates to the central parsing service database.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the equity derivative product pricing device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the equity derivative product pricing device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the equity derivative product pricing device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the equity derivative product pricing device 202, the server devices 204(1)-204(n), or the client devices 208(1)-208(n), for example, may be configured to operate as virtual instances on the same physical machine. In other words, one or more of the equity derivative product pricing device 202, the server devices 204(1)-204(n), or the client devices 208(1)-208(n) may operate on the same physical device rather than as separate devices communicating through communication network(s) 210. Additionally, there may be more or fewer equity derivative product pricing devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
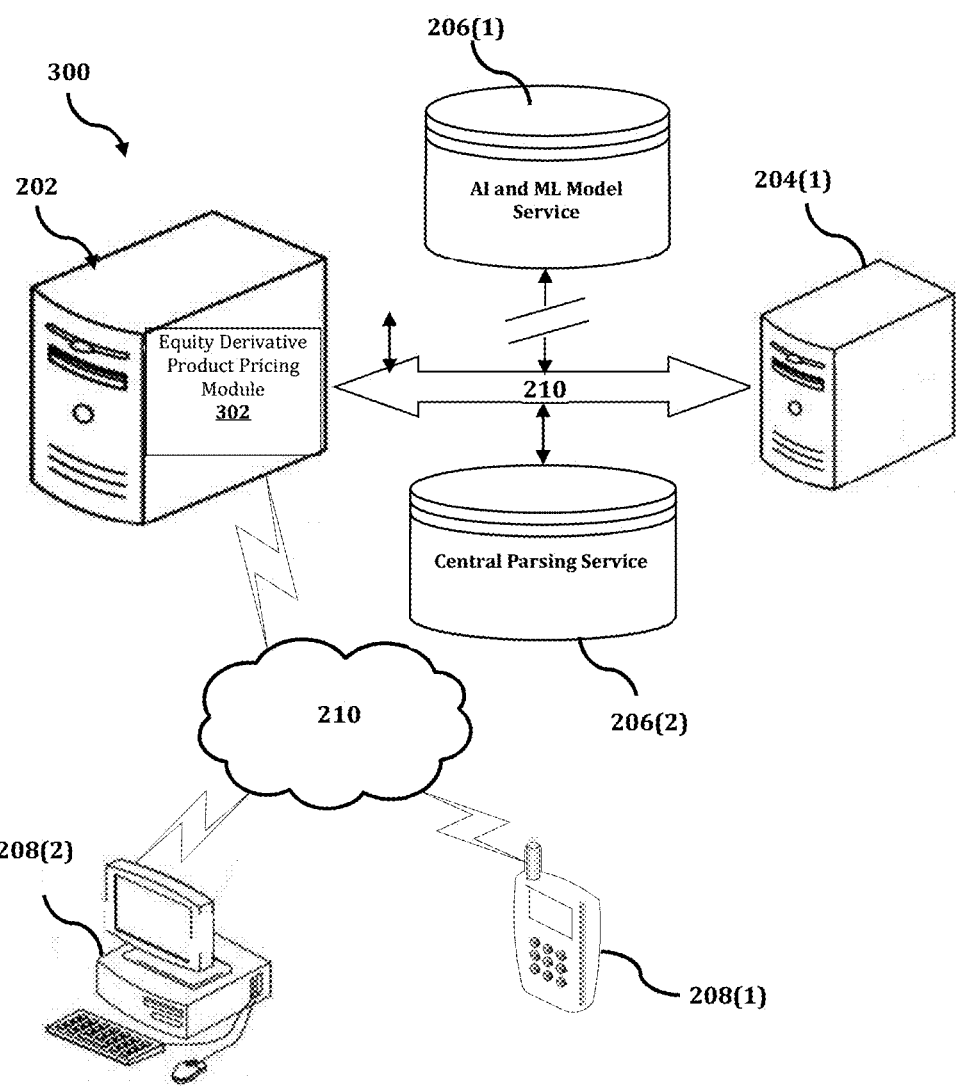
FIG. 3 shows an exemplary system for implementing a method for using AI techniques to stage and complete pricing requests of equity derivative products by automatically formatting natural language requests for price quotes of equity derivative products to standardized template formats and retrieving the requested price quotes from pricing systems.

The equity derivative product pricing device 202 is described and illustrated in FIG. 3 as including an equity derivative product pricing module 302, although it may include other rules, policies, modules, databases, or applications, for example. As will be described below, the equity derivative product pricing module 302 is configured to implement a method for using AI techniques to stage and complete pricing requests of equity derivative products by automatically formatting natural language requests for price quotes of equity derivative products to standardized template formats and retrieving the requested price quotes from pricing systems.

An exemplary process 300 for implementing a mechanism for using AI techniques to stage and complete pricing requests of equity derivative products by automatically formatting natural language requests for price quotes of equity derivative products to standardized template formats and retrieving the requested price quotes from pricing systems by utilizing the network environment of FIG. 2 is illustrated as being executed in FIG. 3. Specifically, a first client device 208(1) and a second client device 208(2) are illustrated as being in communication with equity derivative product pricing device 202. In this regard, the first client device 208(1) and the second client device 208(2) may be "clients" of the equity derivative product pricing device 202 and are described herein as such. Nevertheless, it is to be known and understood that the first client device 208(1) and/or the second client device 208(2) need not necessarily be "clients" of the equity derivative product pricing device 202, or any entity described in association therewith herein. Any additional or alternative relationship may exist between either or both of the first client device 208(1) and the second client device 208(2) and the equity derivative product pricing device 202, or no relationship may exist.

Further, equity derivative product pricing device 202 is illustrated as being able to access an AI and ML model service 206(1) and a central parsing service 206(2). The equity derivative product pricing module 302 may be configured to access these services for implementing a workflow method of using AI techniques to stage and complete pricing requests of equity derivative products by automatically formatting natural language requests for price quotes of equity derivative products to standardized template formats and retrieving the requested price quotes from pricing systems.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the equity derivative product pricing device 202 via broadband or cellular communication. Of course, these embodiments are merely exemplary and are not limiting or exhaustive.

Upon being started, the equity derivative product pricing module 302 executes a process for using AI techniques to stage and complete pricing requests of equity derivative products by automatically formatting natural language requests for price quotes of equity derivative products to standardized template formats and retrieving the requested price quotes from pricing systems. An exemplary process for using AI techniques to stage and complete pricing requests of equity derivative products by automatically formatting natural language requests for price quotes of equity derivative products to standardized template format and retrieving the requested price quotes from pricing systems is generally indicated at flowchart 400 in FIG. 4.

In process 400 of FIG. 4, at step S402, the equity derivative product pricing module 302 receives, via the front-end application, a user submitted communication requesting a price quote for an equity derivative product. In an exemplary embodiment, the communication may be received from at least one unstructured natural language pathway (e.g., chat, voice, audio, text, electronic communication, email, etc.) and may include, e.g., at least one from among an un-structured text request, a colloquial terminology request, and a natural language request. In an exemplary embodiment, the system is text source agnostic and is able to process any textual input-including multiple RFQs (e.g., tabular, written, or otherwise). Information sources, e.g., include but are not limited to: chat sources, emails, attachments/files, or translated information from telephone conversations. The system is language agnostic, meaning it is capable of handling text from different language sources (e.g., English, German, French, etc.).

At step S404, the equity derivative product pricing module 302 sends the user submitted communication from the front-end application to the central parsing service. In an exemplary embodiment, the central parsing service mediates communication between the front-end application and the NLP AI/ML service. In an exemplary embodiment, the central parsing service can log and record information throughout the process. In an exemplary embodiment the central parsing service may contain NLU components that generate a template request from the user submitted communication.

At step S406 the equity derivative product pricing module 302, via the central parsing service, sends the communication to the NLP AI/ML service for extracting each attribute from the communication. In an exemplary embodiment, the attributes may include, e.g., at least one from among assets, dates, types of requested equity derivative products, strike prices, units, expiration dates, notionals, and currencies. In exemplary embodiments, the NLP AI/ML service performs a series of verification and normalization routines on the produced output. In an exemplary embodiment, the extracted attributes are sent back to the central parsing service.

Then, at step S408, the equity derivative product pricing module 302, via the central parsing service, formats the extracted attributes to a template request. In an exemplary embodiment, the template request may be in a standardized format to produce a structured output that may include, e.g., each of an asset, an expiration date, a strike price, a type of equity derivative product, and a number of units relating to the requested price quote. In an exemplary embodiment, the equity derivative product pricing module 302, via the central parsing service, may assume missing attributes to produce the template request.

At step S410, the equity derivative product pricing module 302, sends the template request from the central parsing service to the front-end application, and the front-end application outputs the template request in a display for the user to review. In an exemplary embodiment, the front-end application may include a GUI that includes inputs to allow the user to modify and/or accept displayed template request. Once the template request is verified (i.e., accepted) it is ready to be sent to a pricing system.

At step S412, the equity derivative product pricing module 302 records the user actions/modifications of the template request and sends the recorded data from the front-end application to a feedback application programming interface (API) service. In an exemplary embodiment, the feedback API service may receive information, e.g., about the original request, the original template request, the verified template request, user modifications, and/or user details. In an exemplary embodiment, the recorded data may be used for system improvements.

At step S414, the equity derivative product pricing module 302 sends the verified template request from the front-end application to the pricing system. In an exemplary embodiment, the pricing system may be automatic or manual. In an exemplary embodiment, the pricing system reads the template requests and generates a price quote based on the template request.

At step S416, the equity derivative product pricing module 302 sends the price quote from the pricing system to the front-end application.

At step S418, the equity derivative product pricing module 302 displays, via the GUI, the price quote. In an exemplary embodiment, the user may use the GUI to purchase the equity derivative product at the displayed price quote.

Figure 5:
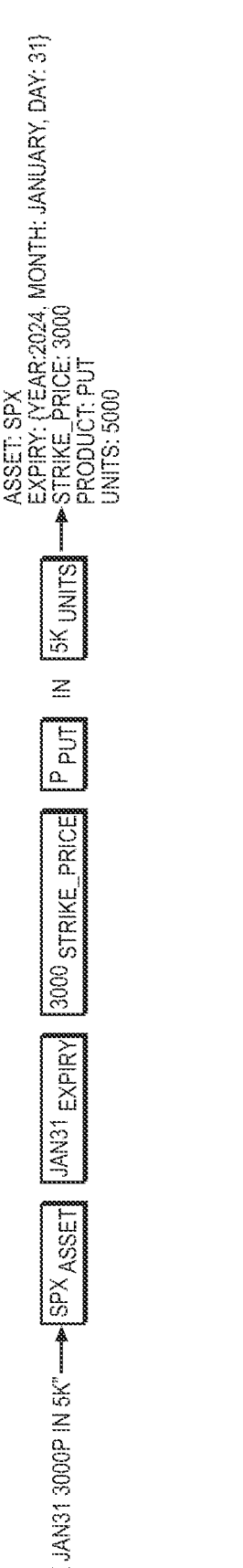
FIG. 5 is a flow diagram that illustrates an example demonstration of request for quote component identification from natural language, followed by mapping to a structured template in a method for using AI techniques to stage and complete pricing requests pricing of equity derivative products by automatically formatting natural language requests for price quotes of equity derivative products to standardized template formats and retrieving the requested price quotes from pricing systems.

FIG. 5 is a flow diagram 500 that illustrates an example demonstration of a RFQ component (i.e., attribute) identification from a natural language request, followed by mapping to a structured template in a method for using AI techniques to stage and complete pricing requests of equity derivative products by automatically formatting natural language requests for price quotes of equity derivative products to standardized template formats and retrieving the requested price quotes from pricing systems, according to an exemplary embodiment. In an exemplary embodiment, as illustrated in FIG. 5, in the first step, unstructured text "SPX Jan31 300P in 5k" is input into the equity derivative product pricing module 302. The input text is then passed to the NLP system to identify individual components or attributes from the text. For example, as shown in FIG. 5, "SPX" is identified as the asset, "Jan31" is identified as expiration date (i.e., expiry), "3000" is identified as the strike price, "p" is identified as the product type and to mean "put", and "5k" is identified as the number of units. In the next step, the request for quote attributes or parameters is further normalized and passed to additional NLU components and formatted to a structured template.

In an exemplary embodiment, there are multiple variations of both the input and output of the example as shown in FIG. 5. Depending on the natural language input, the various parameters may be expressed differently. In an exemplary embodiment, it is the intention of the system to generate the same output structure if the same downstream OMS system is to be used. Furthermore, owing to variations within the downstream OMS system, the output format may vary (e.g., different field names (e.g., asset=ticker, expiry=maturity, etc.), or representation structures, etc.). The example shown in FIG. 5 is merely a single representation of many that would be supported by the workflow and system described herein.

In addition to varied input/output structures, certain parameters may be assumed. For example, expiries are forward looking, and often assumed due to the fact they are not written in their entirety. In the example shown in FIG. 5, the year 2024 is the next available January 31st date at the time of input, but the same text submitted in August of 2022, would yield a 2023 year output. In addition, there are often standard expiry dates which are often referenced as "Jan24" where this indicates the standard expiry date in January of the year 2024.

If any portions of the output are incorrect, it is the user's responsibility to remedy the errors. Examples of errors include, but are not limited to: missed parameter(s)—(e.g., asset not recognized/populated on screen); incorrect parameters (e.g., 5k in the position of strike price); failed value normalization (e.g., January 31st not displayed as Jan31); failed default/assumed parameter addition (e.g., Jan31 not pre-appended with 23); other various structuring errors (e.g., improperly mapped attributes to specific trade legs, incorrect assumptions, etc.).

Figure 6:
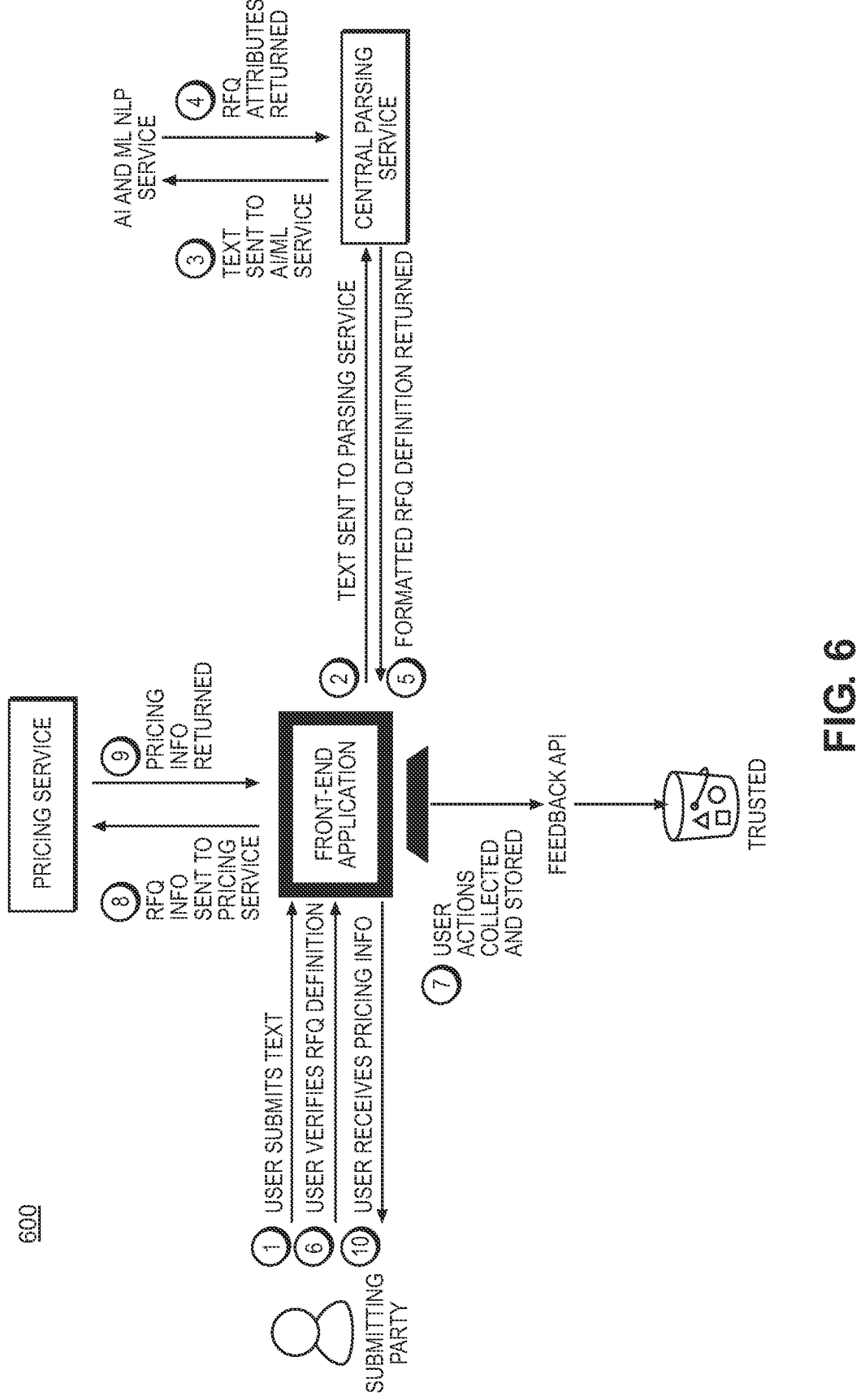
FIG. 6 is a flow diagram that illustrates an exemplary process for implementing a method for using AI techniques to stage and complete pricing requests of equity derivative products by automatically formatting natural language requests for price quotes of equity derivative products to standardized template formats and retrieving the requested price quotes from pricing systems.

FIG. 6 is a flow diagram 600 that illustrates an exemplary process for implementing a method for using AI techniques to stage and complete pricing requests of equity derivative products by automatically formatting natural language requests for price quotes of equity derivative products to standardized template formats and retrieving the requested price quotes from pricing systems. In an exemplary embodiment, FIG. 6 further represents an AI/ML enhanced workflow of rapid pricing of equity derivatives instruments from natural language input. Text input is passed to a sequence of systems which work to understand RFQ details and populate pricing compatible templates. Upon pricing, indications of the priced quote are returned to the submitting party as the final step.

In an exemplary embodiment, each workflow step of FIG. 6 may include one or more components or operations as it relates to the step. Broadly, descriptions of individual workflow steps as it relates to FIG. 6 are as follows: Step 1: user submits text into a front-end application. Step 2: input text is sent to a central parsing service. Step 3: the central parsing service sends the text to an NLP AI/ML API service which works, e.g., to identify and extract equity derivative attributes, identify trade legs, verify certain parameters, etc. Step 4: extracted information is returned to the central parsing service which works to construct RFQ information into a standard representation shorthand template (i.e., template request) using a combination of returned information and internal rules-based logic. Step 5: the standard representation shorthand template is returned to the front-end application for the submitter to review. Step 6: the user validates the information by accepting or modifying the template if required. Step 7: user actions are logged along with other details pertaining to the request. This information is sent to a Feedback API service which stores the information for later review. Step 8: the user-verified information and the standard representation shorthand template is sent to a pricing system. Step 9: pricing details along with an RFQ summary are returned to the front-end application. Step 10: user reviews pricing information within the front-end application and may choose to communicate this information further through unstructured communication channels.

In an exemplary embodiment, the sequence of above steps allows the user to go from a natural language text representation of one or more RFQs, into a completely quoted trade in a matter of seconds.

In an exemplary embodiment, in step 1, the front-end application includes a specific user-interface which contains features related to simplifying the organizational and workflow aspects of equity derivatives trade booking. It includes, e.g., a specific text input field to which the user supplies natural language text, tabular information on returned values as it relates to each RFQ, client information, trade booking information, and more. The front-end application also contains logic for recording and logging user actions as it relates to the booking process. If specific fields are initially omitted and later filled, the application has the ability to log this information within the request sent to the feedback API. The front-end application allows users to easily modify trade legs, e.g., by adding, removing, and/or altering parameters. It also has features to apply parameters across a basket of RFQs to simplify individual leg construction.

In an exemplary embodiment, in step 2, the central parsing service contains logic for orchestrating, logging/recording, and transformation of values of the RFQ information. Orchestration involves mediating the communication of text between the NLP AI/ML service and the front-end application. The central parsing service also contains logic for logging and recording information along the sequence of the booking. User actions recorded from the GUI can be processed further in the parsing service, as can returned values from the NLP AI/ML service. The central parsing service contains some of the main NLU componentry needed to transform values into the standard shorthand equity derivatives template which is subsequently verified by the user.

In an exemplary embodiment, in step 3, The NLP AI/ML service is responsible for the identification and extraction of relevant financial entities from the input text. In addition, there are a variety of value normalization and internal verification routines which run on the output before it is returned in a response. Trade leg population of multi-legs takes place initially within this step and is used and modified further by downstream components. Further information regarding components which are executed in this step are provided in FIG. 8.

In an exemplary embodiment, in step 4, the central parsing service works to construct trade legs from the returned information. This includes populating details which may have not been present in the original request, as well as identifying alterations to the returned information from step 3. Constructed trade legs are used to formulate a shorthand representation which is subsequently displayed to the end user within the front-end application.

In an exemplary embodiment, in steps 5 and 6, the shorthand information is returned to the end user within the front-end application and further modified if necessary. User verification occurs at this step whereby the shorthand representation is committed to downstream processes such as pricing.

In an exemplary embodiment, in step 7, relevant recorded information is consolidated and sent to a feedback API service. This service receives information, e.g., about the original request, the original and final shorthand representations, user modifications, user details, etc. This information is used for future system improvements.

In an exemplary embodiment, in steps 8 and 9, user-verified shorthand representation is sent to a dedicated pricing system and workflow. The pricing system may be automatic or manual (e.g., depending on the complexity of the products involved). Pricing information is returned alongside the requested products to the front-end application.

In an exemplary embodiment, in step 10, the user reviews the returned pricing information and summarized RFQ information in the front-end application. The user may choose to communicate information to the requesting client party if satisfied.

Figure 7:
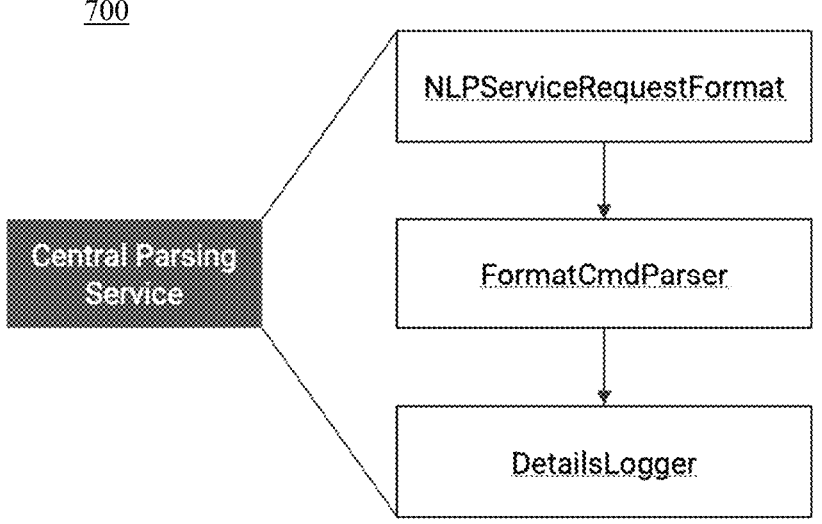
FIG. 7 is a flow diagram that illustrates the components within the central parsing service used in a method for using AI techniques to stage and complete pricing requests of equity derivative products by automatically formatting natural language requests for price quotes of equity derivative products to standardized template formats and retrieving the requested price quotes from pricing systems.

FIG. 7 is a flow diagram 700 that illustrates the components within the central parsing service used in a method for using AI techniques to stage and complete pricing requests of equity derivative products by automatically formatting natural language requests for price quotes of equity derivative products to standardized template formats and retrieving the requested price quotes from pricing systems. In an exemplary embodiment, as shown in FIG. 7, the central parsing service contains three main components: NLPServiceRequestFormat, FormatCmdParser, and DetailsLogger. In an exemplary embodiment, in the NLPServiceRequestFormat component, the input text is transformed into a request format compatible with the NLP Service component. In the FormatCmdParser, the returned details from the NLP service are assimilated and transformed into a command line representation shorthand. The FormatCmdParser includes routines to normalize, e.g., dates, labels/predictions, and units/notionals. It also contains logic to quality check the output. Additional assumed parameters may be added, as well as specific logging steps staged where missing values may be present. The final component of the central parsing service includes, e.g., a DetailsLogger, which synthetizes relevant information to be logged for future review. This includes information about, e.g., parsing times, modifications to original formats, the NLP service response, historical summary, and more.

In an exemplary embodiment, the central parsing service may contain additional components that are not shown but work in conjunction with the upstream and downstream steps to provide additional detail and tracking as it pertains to the request.

Figure 8:
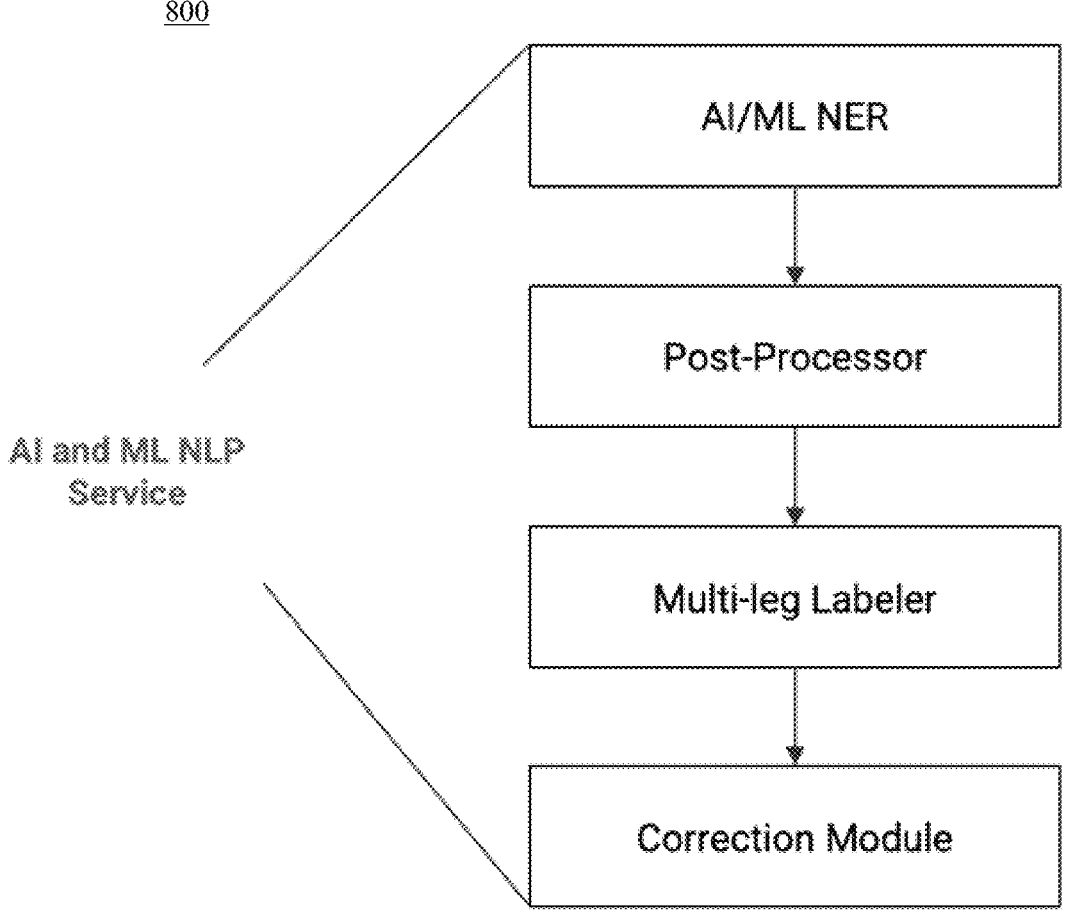
FIG. 8 is a flow diagram that illustrates the components within the AI and ML NLP Service used in a method for using AI techniques to stage and complete pricing requests of equity derivative products by automatically formatting natural language requests for price quotes of equity derivative products to standardized template format and retrieving the requested price quotes from pricing systems, according to an exemplary embodiment.

FIG. 8 is a flow diagram 800 that illustrates the components within the AI/ML NLP Service used in a method for using AI techniques to stage and complete pricing requests of equity derivative products by automatically formatting natural language requests for price quotes of equity derivative products to standardized template formats and retrieving the requested price quotes from pricing systems, according to an exemplary embodiment. In an exemplary embodiment, the AI/ML NLP service contains sequenced steps needed to process raw natural language into a structured representation capable of being consumed by downstream systems. The service may include ML componentry, as well as rules-based logic. It may also include components which are specifically designed to evaluate the output before being returned to downstream systems.

In an exemplary embodiment, the NLP service endpoint contains specialized components organized into a pipeline. Broadly the pipeline may include components which operate to process the textual input, pass it to the machine learning componentry, and structure the output into a common format for consumption. In the AI/ML named entity recognition (NER) component, textual information is processed into a sequence of characters and fed into a deep learning model. Specific features which are inputted into the model may include, e.g., a character embedding along with a word-level feature embedding of equivalent dimension and specifying how the characters relate to higher-level word features obtained from traditional tokenization. In an exemplary embodiment, according to an aspect of this present disclosure, the methodologies by which the AI/ML model is tuned and used may be updated with changed usage details when retraining and updating the system.

In an exemplary embodiment, the equity derivative product pricing module 302 is generally designed to enhance the workflow and user experience of sales processes. The equity derivative product pricing module 302 may have connections, e.g., to cloud computing, NLP, ML, NER, named entity disambiguation, trading, sales booking, and multi-step decision-making in the process by which institutional and retail investors book equity derivatives products. It is to be understood that the systems of the examples described herein are for exemplary purposes, as many variations of the specific hardware and software used to implement the examples are possible, as may be appreciated by those skilled in the relevant art(s).

In an exemplary embodiment, the equity derivative product pricing module 302 may include command-line representation used for booking equity derivatives products that greatly simplifies many aspects of the booking process (e.g., shorthand representation of product attributes, chaining of multiple RFQ components, dual mechanisms for booking of certain multileg products (i.e., multiple pathways for achieving the same product booking based on different shorthand entry points)).

In an exemplary embodiment, the equity derivative product pricing module 302 may include NLP methodologies that are specifically applied to equity derivatives products using ML. The equity derivative product pricing module 302 may include a unique NER modeling architecture and features based on character sequences instead of traditional word-level modeling. In an exemplary embodiment, a unique word-level feature may be created and supplied to the model. In an exemplary embodiment, noteworthy NLP features may include specialized programmatic systems verifications of specific equity derivatives entities.

In an exemplary embodiment, the equity derivative product pricing module 302 may include highly specific NLP normalizations for colloquial terminology expressed within equity derivatives RFQ structures (e.g., dates, product mentions, strike prices, units, notionals, currencies, etc.) required to adequately process requests.

An RFQ for an equity derivative product may be input and received in a variety of different formats. In an exemplary embodiment, the equity derivative product pricing module 302 can identify, extract, and normalize each of these different formats into a common or standardized format. For example, listed are non-limiting examples of different types of RFQ that can be standardized by the equity derivative product pricing module 302, e.g., in an exemplary embodiment: 1) 250 slhn se p520 mar22 xto v524; 2) DOP SPX Jul. 16, 2021 4130P/3510 Index; 3) SPX Jan31 3000 p in 5k; 4) Can I have a 3700 put on SPX with a Jan. 31, 2023, expiry? 500 contracts please; and 5)

| IWM | | | | US = 178.1 |
|---|---|---|---|---|
| IWM | US | Apr. 21, 2023 | P195 | −3000 |
| IWM | US | Apr. 21, 2023 | C195 | −3000 |
| IWM | US | Sep. 15, 2023 | P195 | +6000 |
| IWM | US | Sep. 15, 2023 | C195 | +6000 |

In an exemplary embodiment, to accelerate the execution of equity derivatives RFQs, the equity derivative product pricing module 302 includes a real-time NLP AI system which can: parse RFQ text and extract/identify relevant attributes/entities such as product type, strike price, expiry etc., normalize those attributes/entities into a common format (e.g., "$100 mm"=100,000,000 USD, "Dec. 20, 2024"/ "Dec. 20th 2024"/"Dec. 20 24"=year: 2024, month: 12, day: 20), and populate downstream OMS templates with this collective information. The system is text source agnostic and is able to process any textual input-including multiple RFQs (e.g., tabular, written, or otherwise). Information sources include but are not limited to, e.g., chat sources, emails, attachments/files, or translated information from telephone conversations. The system is language agnostic, meaning it is capable of handling text from different language sources (e.g., English, German, French, etc.).

In an exemplary embodiment, the attributes identified from within the RFQ text, as well as default/assumed values of attributes are displayed to the user on a best-effort basis. That is, if the system can detect all the parameters, it works to structure those parameters using a sequence of NLU routines and populates trade RFQ information for each parameter as part of each trade leg. If some attributes are available but others are missing, some default values may be used (e.g., current year for expiry, or a standard expiry date of the current month). Default values may be populated in scenarios where no year is explicitly written in the text or if the NLP system failed to identify the expiry from the input. If any attributes or defaults are not available, or are incorrect, the user has the responsibility of modifying the initial field population forming the template. In this case, the process mirrors a manual workflow, but with the augmented ability whereby the user is not required to add all fields, only those omitted (e.g., strike is missing/incorrect-so they add/modify it, respectively).

In an exemplary embodiment, the model/system scope includes all equity derivatives products which can be assembled from the set of product attributes outputted from the system. Equity derivatives represent a unique product class whereby the addition of a single simple parameter can specify an entirely different derivative product. One example of this would be a barrier option. When specifying barrier options, the RFQ will contain traditional parameters corresponding to a put or call, but with an additional specification of a knock direction (e.g., down-and-out). This parameter places restrictions on an otherwise unrestricted put/call, which impacts downstream pricing owing to this adjustment of risk. Examples of system input and output are shown below in Table 1.

TABLE 1

Typical RFQ Input Examples and Resulting
Template Request Output

| Input text | System output |
|---|---|
| XPH3 = 6990 | 500 AS51 21 Sep. 2023 7000 |
| AS51 Sep. 21, 2023 C7000 + 500 | c xto v6990 |
| kospi2 April 2023 305/290 put | 920 KOSPI2 April 2023 305 290 |
| spread in 920 x, fut ref: 307 | ps xto v307 |
| −1400x DHE GR Dec. 15, 2023 | −1400 DHE GY 15 Dec. 2023 |
| P30 equity | 30 p xto + 1750 DHE GY |
| +1750x DHE GR Dec. 15, 2023 | 15 Dec. 2023 24 p xto |
| P24 equity | |
| SX5E 2016 June exp 4300/3800 | 2051 SX5E 16 Jun. 2023 4300 |
| put spread in 2051 lots (mult 10) | 3800 ps xto v4042 |
| pls, exchange delta VGM3 at 4042 p | |
| IWM US = 178.1 | −3000 IWM 21 Apr. 2023 195 p |
| IWM US Apr. 21, 2023 P195 −3000 | xto v178.1 − 3000 IWM 21 Apr. |
| IWM US Apr. 21, 2023 C195 −3000 | 2023 195 c xto v178.1 + 6000 |
| IWM US Sep. 15, 2023 P195 +6000 | IWM 15 Sep. 2023 195 p xto |
| IWM US Sep. 15, 2023 C195 +6000 | v178.1 + 6000 IWM 15 Sep. 2023 |
| | 195 c xto v178.1 |

In an exemplary embodiment, there are multiple modules used to create the end-to-end AI system as part of the equity derivative product pricing module 302. Each module within the equity derivative product pricing module 302 has a unique responsibility and specific input/output pattern. For example, if the input text is "SPX Jan31 3000P in 5k", the correct identification of this particular option is displayed to a human user with a unique shorthand representation within the front-end application as: "5000 SPX P 3000 24Jan31".

In an exemplary embodiment, the ML portion of the model will try to identify the entities in the text. Using the above example, it will identify that the character sequence "SPX" refers to an asset, "January 31" refers to expiry date, "P" refers to a "Put" option, and "5k" as the unit's size. The system will be successful if it correctly identifies that the client is asking for an SPX put at 3000 strike, January 31 expiry, in 5k contracts/unit size. Subsequent modules of the system process and modify the returned entities, culminating in a final transformation into a representation required to book or execute on the RFQ. FIG. 5 demonstrates the identification of RFQ components and subsequent NLU to produce a structured output. A structured output is required to properly sequence following steps of order management and pricing workflows. In exemplary embodiments, the equity derivative product pricing module 302 receives input text, tokenizes the text, and then provides an NER output. For example:

Input Text: "Hi can I get SPX P350 Mar. 14, 2023 500x pls?"
Tokenized Text:
['H', 'i', ' ', 'c', 'a', 'n', ' ', 'I', ' ', 'g', 'e', 't', ' ', 'S', 'P', 'X', ' ', 'P', '3', '5', '0', ' ', '3', '/', '1', '4', '/', '2', '0', '2', '3', ' ', '5', '0', '0', 'x', ' ', 'p', 'T', 's', '?']
NER output:
['O', 'O', 'O', 'O', 'O', 'O', 'O', 'O', 'O', 'O', 'O', 'O', 'O', 'B-asset', 'I-asset', 'I-asset', 'O', 'B-Put', 'B-strike_price', 'I-strike_price', 'I-strike_price', 'O', 'B-expiry', 'I-expiry', 'I-expiry', 'I-expiry', 'I-expiry', 'I-expiry', 'I-expiry', 'I-expiry', 'I-expiry', 'O', 'B-units', 'I-units', 'I-units', 'I-units', 'O', 'O', 'O', 'O', 'O']

In an exemplary embodiment, after the NER output is provided the equity derivative product pricing module 302 then maps the input character positions to their span locations in the text and formats a response structure, for example:
Output:

```
{'entities': [
{'entity': 'asset',
   'value': 'SPX',
   'start': 13,
   'end': 16},
{'entity': 'Put',
   'value': 'P',
   'start': 17,
   'end': 18},
{'entity': 'strike_price',
   'value': '350',
   'start': 18,
   'end': 21},
{'entity': 'expiry',
   'value': '3/14/2023',
   'start': 22,
   'end': 31},
{'entity': 'units',
   'value': '500x',
   'start': 32,
   'end': 36}],
}
```

After initial formatting, downstream components of the NLP service perform post-processing fixes, attachment of multileg labels, and entity corrections using rule-based methodology. Post-processing may include identification of high-precision entity mentions, invalid entity identifications, invalid trailing characters, and any filtering of information unnecessary for pricing. Next, the multileg labeler applies leg information to aide in the identification of specific trade legs of the RFQ. For example:

```
{'entities': [
   {'entity': 'asset',
   'value': 'SPX',
   'start': 13,
   'end': 16,
   'extra': [{'key': 'label',
      'value': 'label_product_attributes'},
      {'key': 'multileg', 'value': 'Leg_1'},
      {'key': 'package', 'value': 'Package_1'}]},
   {'entity': 'Put',
   'value': 'P',
   'start': 17,
   'end': 18,
   'extra': [{'key': 'label',
      'value': 'label_derivatives_product'},
      {'key': 'multileg', 'value': 'Leg_1'},
      {'key': 'package', 'value': 'Package_1'},
```

-continued

```
    {'entity': 'strike_price',
    'value': '350',
    'start': 18,
    'end': 21,
    'extra': [{'key': 'label',
        'value': 'label_product_attributes'},
        {'key': 'multileg', 'value': 'Leg_1'},
        {'key': 'package', 'value': 'Package_1'}]},
    {'entity': 'expiry',
    'value': '3/14/2023',
    'start': 22,
    'end': 31,
    'extra': [{'key': 'label',
        'value': 'label_product_attributes'},
        {'key': 'multileg', 'value': 'Leg_1'},
        {'key': 'package', 'value': 'Package_1'}]},
    {'entity': 'units',
    'value': '500x',
    'start': 32,
    'end': 36,
    'extra': [{'key': 'label',
        'value': 'label_product_attributes'},
        {'key': 'multileg', 'value': 'Leg_1'},
        {'key': 'package', 'value': 'Package_1'}]}],
}
```

Controls: As the system is involved in potentially high-valued and complex trades, system performance and controls are of the utmost importance. System malfunctions can lead to sales submitting a request that does not represent the request the client requested and accordingly a price that is not applicable to the clients intended request. This risk is rare, and only occurs due to human salesperson error. If the salesperson fails to check for accuracy at the input to the OMS, and also fails to do due diligence before blindly copy/pasting details back to the client, errors can propagate. This risk is no greater than the current risk of manual entry. In addition, the system proposed here is in many ways less risky than the existing workflow due to programmatic accuracy check modules which correct and eliminate mistakes from occurring (e.g., the word "Put" can never be misinterpreted as a "Call" option) which is not something that exists within the existing manual workflow. Several controls are in place to address this, e.g., programmatic error checking modules (e.g., "call" vs. "put" confusions), sales will be able to see the input and the output of the model and verify if the parsing is correct, trader will be able to see the original request and the submitted template from sales.

Those skilled in the art appreciate that the above-listed components of the AI/ML system for workflow enhancement are merely meant to be exemplary and are not intended to be exhaustive and/or inclusive. Furthermore, the examples of input/output above are also meant to be exemplary and similarly are not meant to be exhaustive and/or inclusive.

Although only one central parsing service and associated componentry is illustrated in FIG. 6 and FIG. 7, the disclosure is not limited thereto. Any number of desired parsing services may be utilized for use in this invention herein. In addition, while the trained ML model contains specific tuning on the historical data, any trained ML model which performs similar operations may be utilized. The storage locations specified in the feedback loop and elsewhere may also be any suitable to produce programming, e.g., for searching, monitoring, and analyzing machine-generated data via a web interface, etc., but the disclosure is not limited thereto.

Accordingly, with this technology, an optimized process for using AI techniques to stage and complete pricing requests of equity derivative products by automatically formatting natural language requests for price quotes of equity derivative products to a standardized template format and retrieving the requested price quote is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

The invention claimed is:

1. A method for automatically formatting communications into a structured format, the method being implemented by at least one processor, the method comprising:

receiving, by the at least one processor via a front-end application, a communication that relates to a request for a price quote for at least one equity derivative product, wherein the front-end application contains logic for recording and logging a user action associated with the request for the price quote;

transmitting, by the at least one processor, the communication from the front-end application to a natural-language-processing (NLP) machine-learning (ML) model;

mediating, by the at least one processor via a central parsing service, the transmitting of the communication, wherein the mediating includes recording and logging information during the transmitting of the communication, wherein the central parsing service includes natural language understanding (NLU) components for template request generation, and wherein the central parsing service contains logic for transforming the communication into a shorthand template;

extracting, by the at least one processor via the NLP-ML model from the shorthand template, attributes of the requested price quote for the at least one equity derivative product;

performing, by the at least one processor via the NLP-ML model, at least one verification operation on the extracted attributes;

transmitting, by the at least one processor, the extracted attributes to the central parsing service;

generating, by the at least one processor via the central parsing service, a template request based on the extracted attributes, wherein the template request has a predetermined format for each of the at least one equity derivative product, and wherein the central parsing service automatically fills in for missing attributes during the generating of the template request;

transmitting, by the at least one processor, the template request from the central parsing service to the front-end application;

simplifying, by the at least one processor via the front-end application, the template request by applying parameters to the request for the price quote;

displaying, by the at least one processor via a graphical user interface (GUI) of the front-end application, each simplified template request for review by a user, wherein the GUI includes an input mechanism for at least one from among accepting and modifying each template request;

transmitting, by the at least one processor, information received by the input mechanism to a feedback application programming interface (API) for implementing improvements for automatically formatting communications into a structured format;

transmitting, by the at least one processor, each reviewed template request to a pricing system;

receiving, by the at least one processor via the front-end application from the pricing system, a price quote for each of the at least one equity derivative product; and displaying, by the GUI, the price quote.

2. The method of claim 1, wherein the extracting of the attributes comprises:

applying the NLP-ML model to identify each of an asset, an expiration date, a strike price, a type of equity derivative product, and a number of units from the communication; and formatting each of the asset, the expiration date, the strike price, the type of equity derivative product, and the number of units into the template request having the predetermined format.

3. The method of claim 1, wherein the attributes comprise at least one from among assets, dates, types of requested equity derivative products, strike prices, units, expiration dates, notionals, and currencies.

4. The method of claim 1, wherein the communication comprises at least one from among an un-structured text request, a colloquial terminology request, and a natural language request, and wherein the communication is received via at least one from among a voice command, an audio command, a text command, an email command, and an electronic communication command.

5. The method of claim 1, wherein the at least one equity derivative product includes textual information relating to at least one from among an option, a put, a call, a future, a warrant, a swap, a single-leg option, a put spread, a call spread, call vs call, a barrier option, and a multi-leg option.

6. The method of claim 1, wherein the modifying of each template request comprises prompting the user to provide an input for at least one from among adding at least one attribute parameter, removing at least one attribute parameter, and altering at least one attribute parameter from each template request.

7. The method of claim 1, wherein the extracting of the attributes comprises:

analyzing, by the at least one processor via the NLP-ML model, the communication to identify at least one sequence of characters and a respective attribute category that is included in a list of attribute categories that is associated with the predetermined format; and wherein the generating of the template request comprises designating each of the identified at least one sequence of characters in order by their respective attribute category to match the predetermined format.

8. The method of claim 7, wherein the generating of the template request further comprises applying a sequence of natural language understanding (NLU) routines for performing the designating of each of the identified at least one sequence of characters, and when at least one attribute from the predetermined format is missing from the extracted attributes, the method further comprises generating a default attribute value to populate the template request to match the predetermined format.

9. The method of claim 1, wherein the central parsing service includes:

an NLP service request formatter, wherein the NLP service request formatter transforms the communication into a first format that is compatible with the NLP-ML model;

a format command parser, wherein the format command parser transforms the extracted attributes into a command line representation shorthand; and a details logger, wherein the details logger performs the recording and logging of the information.

10. The method of claim 1, wherein the NLP-ML model includes:

an artificial intelligence (AI) ML named entity recognizer (NER) that processes the communication into a sequence of characters that are transmitted to a deep learning model to generate the template request based on a character embedding and a word-level feature embedding.

11. A computing apparatus for automatically formatting communications into a structured format, the computing apparatus comprising:

a processor;

a memory;

a display; and a communication interface coupled to each of the processor, the memory, and the display, wherein the processor is configured to:

receive, via the communication interface and a front-end application, a communication that relates to a request for a price quote for at least one equity derivative product, wherein the front-end application contains logic for recording and logging a user action associated with the request for the price quote;

transmit the communication from the front-end application to a natural-language-processing (NLP) machine-learning (ML) model;

mediate, via a central parsing service, the transmitting of the communication, wherein the mediating includes recording and logging information during the transmitting of the communication, wherein the central parsing service includes natural language understanding (NLU) components for template request generation, and wherein the central parsing service contains logic for transforming the communication into a shorthand template;

extract, via the NLP-ML model from the shorthand template, attributes of the requested price quote for the at least one equity derivative product;

perform, via the NLP-ML model, at least one verification operation on the extracted attributes;

transmit the extracted attributes to the central parsing service;

generate, via the central parsing service, a template request based on the extracted attributes, wherein the template request has a predetermined format for each of the at least one equity derivative product, and wherein the central parsing service automatically fills in for missing attributes during the generating of the template request;

transmit the template request from the central parsing service to the front-end application;

simplify, via the front-end application, the template request by applying parameters to the request for the price quote;

display, by the display via a graphical user interface (GUI) of the front-end application, each simplified template request for review by a user, wherein the GUI includes an input mechanism for at least one from among accepting and modifying each template request;

transmit information received by the input mechanism to a feedback application programming interface (API) for implementing improvements for automatically formatting communications into a structured format;

transmit, via the communication interface, each reviewed template request to a pricing system;

receive, via the communication interface and the front-end application from the pricing system, a price quote for each of the at least one equity derivative product; and display, by the display via the GUI, the price quote.

12. The computing apparatus of claim 11, wherein the processor is further configured to extract the attributes by:

applying the NLP-ML model to identify each of an asset, an expiration date, a strike price, a type of equity derivative product, and a number of units from the communication; and formatting each of the asset, the expiration date, the strike price, the type of equity derivative product, and the number of units into the template request having the predetermined format.

13. The computing apparatus of claim 11, wherein the attributes comprise at least one from among assets, dates, types of requested equity derivative products, strike prices, units, expiration dates, notionals, and currencies.

14. The computing apparatus of claim 11, wherein the communication comprises at least one from among an un-structured text request, a colloquial terminology request, and a natural language request, and wherein the communication is received via at least one from among a voice command, an audio command, a text command, an email command, and an electronic communication command.

15. The computing apparatus of claim 11, wherein the at least one equity derivative product includes textual information relating to at least one from among an option, a put, a call, a future, a warrant, a swap, a single-leg option, a put spread, a call spread, call vs call, a barrier option, and a multi-leg option.

16. The computing apparatus of claim 11, wherein the modifying of each template request comprises prompting the user to provide an input for at least one from among adding at least one attribute parameter, removing at least one attribute parameter, and altering at least one attribute parameter from each template request.

17. The computing apparatus of claim 11, wherein the processor is further configured to:

extract, via the NLP-ML model, the attributes by analyzing the communication to identify at least one sequence of characters and a respective attribute category that is included in a list of attribute categories that is associated with the predetermined format; and generate the template request by designating each of the identified at least one sequence of characters in order by their respective attribute category to match the predetermined format.

18. The computing apparatus of claim 17, wherein the processor is further configured to generate the template request by:

applying a sequence of natural language understanding (NLU) routines for the designating of each of the identified at least one sequence of characters, and when at least one attribute from the predetermined format is missing from the extracted attributes, generating a default attribute value to populate the template request to match the predetermined format.

19. A non-transitory computer readable storage medium storing instructions for automatically formatting communications into a structured format, the storage medium comprising executable code which, when executed by a processor, causes the processor to:

receive, via a front-end application, a communication that relates to a request for a price quote for at least one equity derivative product, wherein the front-end application contains logic for recording and logging a user action associated with the request for the price quote;

transmit the communication from the front-end application to a natural-language-processing (NLP) machine-learning (ML) model;

mediate, via a central parsing service, the transmitting of the communication, wherein the mediating includes recording and logging information during the transmitting of the communication, wherein the central parsing service includes natural language understanding (NLU) components for template request generation, and wherein the central parsing service contains logic for transforming the communication into a shorthand template;

extract, via the NLP-ML model from the communication, attributes of the requested price quote for the at least one equity derivative product;

perform, via the NLP-ML model, at least one verification operation on the extracted attributes;

transmit the extracted attributes to the central parsing service;

generate, via the central parsing service, a template request based on the extracted attributes, wherein the template request has a predetermined format for each of the at least one equity derivative product, and wherein the central parsing service automatically fills in for missing attributes during the generating of the template request;

transmit the template request from the central parsing service to the front-end application;

simplify, via the front-end application, the template request by applying parameters to the request for the price quote;

display, by the display via a graphical user interface (GUI) of the front-end application, each simplified template request for review by a user, wherein the GUI includes an input mechanism for at least one from among accepting and modifying each template request;

transmit each reviewed template request to a pricing system;

transmit information received by the input mechanism to a feedback application programming interface (API) for implementing improvements for automatically formatting communications into a structured format;

receive, via the front-end application from the pricing system, a price quote for each of the at least one equity derivative product; and display, by the display via the GUI, the price quote.

20. The storage medium of claim 19, wherein the executable code is further configured to extract the attributes by:

applying the NLP-ML model to identify each of an asset, an expiration date, a strike price, a type of equity derivative product, and a number of units from the communication; and formatting each of the asset, the expiration date, the strike price, the type of equity derivative product, and the number of units into the template request having the predetermined format.

* * * * *